United States Patent [19]

Kozuka et al.

[11] Patent Number: 4,548,843
[45] Date of Patent: Oct. 22, 1985

[54] DECORATIVE PLASTIC TRIM STRIP

[75] Inventors: Masayoshi Kozuka; Tomihiko Mizutani, both of Anjyo; Kohji Narita, Nagoya, all of Japan

[73] Assignee: Inoue MTP Kabushiki Kaisha, Aichi, Japan

[21] Appl. No.: 609,913

[22] Filed: May 14, 1984

Related U.S. Application Data

[63] Continuation-in-part of Ser. No. 216,291, Dec. 15, 1980, abandoned.

[51] Int. Cl.⁴ .................. B32B 15/08; B60R 13/02; B60R 13/04
[52] U.S. Cl. ......................... 428/31; 428/412; 428/458; 428/461; 428/462; 428/463; 428/479.3; 428/509; 52/716
[58] Field of Search ............... 428/31, 412, 457, 458, 428/461–463, 464, 479.3, 509; 49/475; 52/716, 717

[56] References Cited

U.S. PATENT DOCUMENTS 4,052,522 10/1977 Narita ........................ 428/31
4,223,052 9/1980 Tsuda et al. ................. 428/31
4,292,354 9/1981 Katoh ......................... 428/31

Primary Examiner—Alexander S. Thomas
Attorney, Agent, or Firm—Armstrong, Nikaido, Marmelstein & Kubovcik

[57] ABSTRACT

A plastic trim strip comprising an outer surface layer which is made of cellulose acetate butyrate having a thickness of from 0.3 to 0.8 millimeters, an inner surface reinforcing layer which is made of stainless steel or stainless bimetal having a thickness of from 0.1 to 0.5 millimeters and an intermediate layer which is located between the outer surface layer and the inner surface reinforcing layer to connect them and which is made of a thermoplastic material selected from the group consisting of acrylonitrile-butadiene-styrene, acrylonitrile-ethylene-propylenediene rubber-styrene, acrylonitrile-acryl rubber-styrene, acrylonitrile-chlorinated polyethylene-styrene, polycarbonate, polyphenyleneoxide, polyphenylenesulfide, and polyamide.

5 Claims, 4 Drawing Figures

DECORATIVE PLASTIC TRIM STRIP

This is a continuation-in-part application of of my application Ser. No. 216,291 filed Dec. 15, 1980, now abandoned.

BACKGROUND OF THE INVENTION

1. Field of the Invention

This invention relates to a decorative plastic trim strip and, in particular, to a plastic trim strip for a vehicle such as an automobile, comprising a reinforcing layer made of stainless steel or stainless bimetal, as a base component.

2. Description of the Prior Art

Various kinds of plastic trim strips are used to decorate furniture, for example, edges of the furniture. These trim strips are usually made of transparent plastics, such as cellulose acetate or polyvinyl choloride, and a decorative material made of nonferrous matal leaf, such as aluminum foil, which is embedded in or put on the transparent plastics. As a decorative material, a decorative plastic film is also used, to which a metal, such as aluminum, is applied and which is embedded in or put on the transparent plastics. The trim strips as mentioned above are light, since the decorative member is made of a nonferrous metal, and, accordingly, they can be advantageously used to decorate furniture or the like. Furthermore, the nonferrous metal leaf can be advantageously used to provide a glossy surface on the trim. However, when such a nonferrous metal leaf is used for a decorative trim for an automobile such as a roof drip trim, a trunk trim, or a window trim, it presents an insufficient rigidity.

For example, a roof drip trim of an automobile usually has a substantially C-shaped opening in which a channelled member of a roof of a vehicle body is fitted. However, when the roof drip trim is mounted to the vehicle body, the fit tends to become loose because of the small rigidity of the trim, so that the displacement of the trim relative to the vehicle body occurs or the trim easily comes out of the channelled member even when the trim is subject to a small impact or shock.

It is therefore very important to increase the rigidity of such a decorative trim for an automobile.

In order to increase the rigidity of a decorative trim, according to the present invention, the trim includes a reinforcing layer made of stainless steel or stainless bimetal.

It should be noted here that it is very difficult to adhere ferrous metal, such as stainless steel, to transparent plastics, and, particularly, to cellulosic plastics which is usually used to make decorative trim for automobiles.

Therefore, consideration has to be directed also to the solution of the difficulty of the adhesion of the reinforcing layer to the plastic body of the trim.

SUMMARY OF THE INVENTION

The primary object of the present invention is to increase the rigidity of a decorative trim by providing an inner surface reinforcing layer made of stainless steel or stainless bimetal.

Another object of the present invention is to provide a highly decorative trim by using cellulose acetate butyrate (CAB) with a high decorative property and a high workability as an outer surface layer of the trim.

Still another object of the present invention is to solve the problem of the difficulty of adhering a metal foil containing stainless steel as base to a surface layer made of CAB.

BRIEF DESCRIPTION OF THE DRAWINGS

In the detailed description of the preferred embodiments of decorative plastic trim strips according to the invention presented below, reference is made to the accompanying drawings, in which.

DETAILED DESCRIPTION OF THE INVENTION

Figure 1:
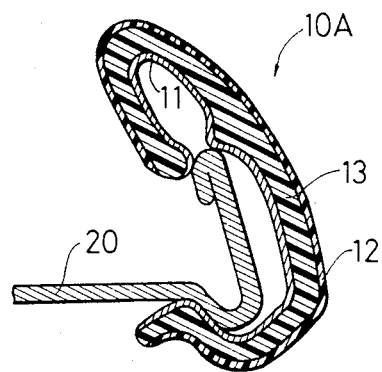
FIG. 1 is a sectional view of a roof drip trim in which a channelled member of a roof of a vehicle body is fitted.

Referring to FIG. 1 of the drawing, the trim 10A according to the present invention includes an inner surface reinforcing layer 11 made of stainless steel or stainless bimetal as a base, outer surface layer 12 made of CAB, and a thermoplastic intermediate layer 13 which can be adhered to the plastics of the outer surface layer 12. The inner surface reinforcing layer 11 and the outer surface layer 12 are rigidly interconnected by means of the intermediate layer 13.

The inner surface reinforcing layer 11 is located on the inner side or rear side of the trim to maintain the trim as it is and to increase the rigidity of the trim. The reinforcing layer 11 is made of stainless steel or stainless bimetal having a thickness of from 0.1 to 0.5 millimeters.

In the exemplary embodiment of the invention as disclosed in the drawings, the reinforcing layer 11 is made from stainless steel plate having a thickness of 0.15 millimeters or stainless steel clad aluminum bimetal (made by Texas Instruments Incorporated) having a thickness of 0.5 millimeters.

The outer surface layer 12 which is a visible decorative layer is made of cellulose acetate butyrate (CAB) having a thickness of from 0.3 to 0.8 millimeters, preferably about 0.5 millimeters. CAB itself has a beautiful transparent gloss, high surface hardness, a high workability and a good weatherproof quality. Accordingly, CAB cab be used as a single substance for the outer surface layer of the trim. In order to increase the decorative effect, it is also possible to mix pigments and/or additives into CAB. When the outer surface layer is colored by carbon black, it adventageously presents a beautiful black gloss and enhances the durability.

The intermediate layer 13 is located between the inner surface reinforcing layer 11 and the outer surface layer 12 to connect the two layers. The intermediate layer 13 is therefore made of a thermoplastic material which is compatible with the plastics forming the outer surface layer 12 or which can be firmly adhered to the outer surface layer by means of an adhesive. Preferably, the intermediate layer 13 is made of a thermoplastic material which can be also adhered to the stainless plate forming the inner surface reinforcing layer 11. Further, when the trim is used as a decorative trim for an automobile, the material of the intermediate layer preferably has a high rigidity and is refractory.

The intermediate layer 13 is made of a thermoplastic material selected from the group consisting of acrylonitrile-butadiene-styrene(ABS), acrylonitrile-ethylene-propylenediene rubber-styrene(AES), acrylonitrile-acryl rubber-styrene(AAS), acrylonitrile-chlorinated polyethylene-styrene(ACS), methacryl-butadiene-styrene(MBS), polycarbonate, polyphenyleneoxide, polyphenylene-sulfide, and polyamide.

In the above-mentioned thermoplastic material, the ABS has a high rigidity and a good heat-resistance and accordingly can be advantageously used for intermediate layer of various kinds of decorative trim. The intermediate layer made from ABS has a thickness of from 0.2 to 0.5 millimeters.

The intermediate layer 13 made from ABS and the outer surface layer 12 of CAB can be adhered to each other by means of an adhesive. Alternatively, it is also possible to connect the two materials by an extrusion ayatem, without the help of an adhesive.

The intermediate layer 13 of ABS can be easily and rigidly connected to the inner surface reinforcing layer 11 of stainless steel of stainless bimetal by mean of an adhesive, such as a thermosetting acrylic adhesive.

Generally speaking, the stainless steel or stainless bimetal, of which the inner surface reinforcing layer 11 is made, cannot be easily adhered to cellulosic plastics including CAB, of which the outer surface layer 12 is made. However, CAB has an advantage of highly-toned brightness and beautiful gloss, and, accordingly CAB is advantageously used to make the outer surface layer of the decorative trim.

One of the features of the present invention resides in the provision of the intermediate layer 13 which makes it possible to connect the outer surface layer 12 made of CAB and the inner surface reinforcing layer 11 made of stainless steel or stainless bimetal and which is made of a plastic which can be selected from a relatively wide range of group of materials. The intermediate layer 13 has a thickness enough to ensure the rigidity of the trim. Further, the thickness of the intermediate layer 13 should be determined in view of the thickness of the trim, since the increase of the thickness of the intermediate layer 13 increases the thickness of the trim.

It is possible to provide a colored intermediate layer 13 on which a transparent surface layer 12 is put in order to increase the decorative effect due to the combination of the color of the intermediate layer and the transparency of the surface layer 12.

As can be understood from the above discussion, according to the present invention, there is provided a decorative trim which is particularly suitable for use as a plastic trim for an automobile and which presents a good decorative effect and a high rigidity.

Figure 2:
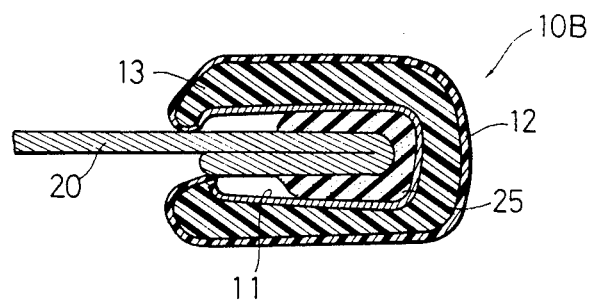
FIG. 2 is a sectional view of a trunk trim which is mounted to a truck panel.

In a trunk trim 10B illustrated in FIG. 2, the trim 10B is connected to the panel (trunk lid) 20 by means of resilience of the trim edges and an adhesive 25.

Figure 3:
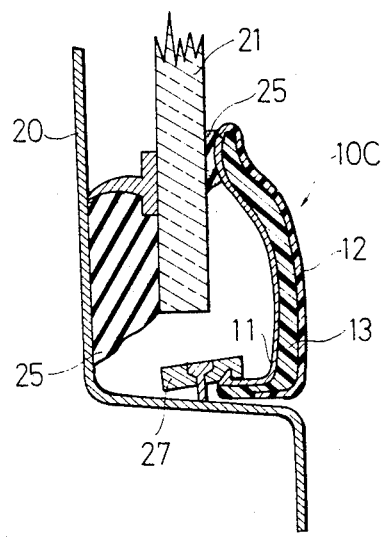
FIG. 3 is a sectional view of a window trim which is mounted to an end of a window glass and a vehicle body panel.

In FIG. 3, the window trim 10C which is fixed on the panel 20 by a clip 27 covers the peripheral edge of the window glass 21 which is bonded to the panel 20 by an adhesive 25.

Figure 4:
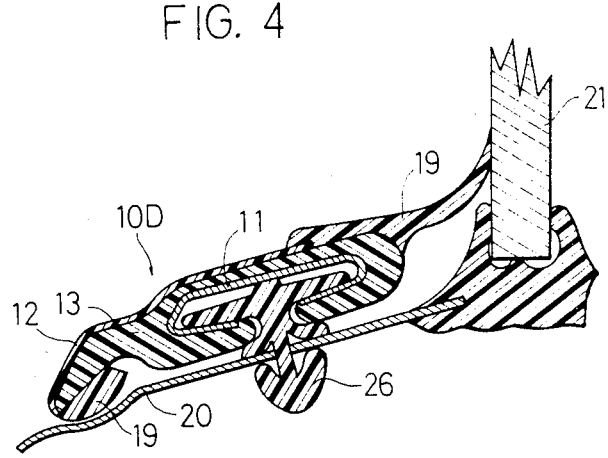
FIG. 4 is a sectional view of another embodiment of a window trim which is connected to an end of a window glass.

In FIG. 4, there is provided a protective layer 19 which is made of soft polyvinyl chloride or the like and which is adapted to prevent the trim from coming into direct contact with the panel 20 and the window glass 21 and to prevent a foreign substance, such as dust, from coming into the gap between the window glass and the trim. The protective layer 19 also contributes to the prevention of displacement of the trim and to prevention of the occurrence of noise which otherwise would occur. The window trim 10D is connected to the panel 20 by means of a clip 26.

What is claimed is:

1. A plastic trim strip for an automotive vehicle body, the strip having an outline from arcuate to C-shaped, comprising
    (a) an outer surface layer which is made of cellulose acetate butyrate having a thickness of from 0.3 to 0.8 millimeters,
    (b) an inner surface reinforcing layer means disposed in opposed relationship to and for attachment to said automotive vehicle body to maintain the shape of the trim and to increase the rigidity of the trim, which means is made of stainless steel or stainless steel clad aluminum having a thickness of from 0.1 to 0.5 millimeters and
    (c) an intermediate layer which is located between the outer surface layer and the inner surface reinforcing layer means bonded to both the outer surface layer and the inner surface reinforcing layer means and which is made of a thermoplastic material selected from the group consisting of acrylonitrile-butadiene-styrene, acrylonitrile-ethylenepropylene-diene rubber-styrene, acrylonitrile-acryl rubber-styrene, acrylonitrile-chlorinated polyethylene-styrene, methacryl-butadiene-styrene, polycarbonate, polyphenyleneoxide, polyphenylenesulfide, and polyamide.

2. A plastic trim strip according to claim 1, wherein said inner surface reinforcing layer means is made from stainless steel plate having a thickness of 0.15 millimeters.

3. A plastic trim strip according to claim 1, wherein said inner surface reinforcing layer means is made from stainless steel clad aluminium bimetal having a thickness of 0.5 millimeters.

4. A plastic trim strip accroding to claim 1, wherein said outer surface layer is made from cellulose acetate butyrate colored by carbon black.

5. A plastic trim strip according to claim 1, wherein said intermediate layer is made from acrylo-nitrile-butadiene-styrene having a thickness of from 0.2 to 0.5 millimeters.

* * * * *